No. 826,742. PATENTED JULY 24, 1906.
E. F. PRICE.
PROCESS OF REDUCING METALLIC COMPOUNDS AND PRODUCING CARBIDS.
APPLICATION FILED OCT. 13, 1903. RENEWED JAN. 18, 1906.

2 SHEETS—SHEET 1.

Witnesses:
R A Baldwin
Peter Fireman

Inventor:
Edgar F. Price,
by Byrnes & Townsend
Attys.

No. 826,742. PATENTED JULY 24, 1906.
E. F. PRICE.
PROCESS OF REDUCING METALLIC COMPOUNDS AND PRODUCING CARBIDS.
APPLICATION FILED OCT. 13, 1903. RENEWED JAN. 18, 1906.

2 SHEETS—SHEET 2.

Witnesses:
R A Balderson
Peter Fireman

Inventor:
Edgar F. Price,
by Byrnes & Townsend,
Att'ys.

UNITED STATES PATENT OFFICE.

EDGAR F. PRICE, OF NIAGARA FALLS, NEW YORK, ASSIGNOR TO UNION CARBIDE COMPANY, OF NIAGARA FALLS, NEW YORK, A CORPORATION OF VIRGINIA.

PROCESS OF REDUCING METALLIC COMPOUNDS AND PRODUCING CARBIDS.

No. 826,742.      Specification of Letters Patent.      Patented July 24, 1906.

Application filed October 13, 1903. Renewed January 18, 1906. Serial No. 296,677.

*To all whom it may concern:*

Be it known that I, EDGAR F. PRICE, a citizen of the United States, residing at Niagara Falls, in the county of Niagara and State of New York, have invented certain new and useful Improvements in Processes of Reducing Metallic Compounds and Producing Carbids, of which the following is a specification.

This invention especially relates to the production of calcium carbid by the use of an electric furnace.

According to the process the charge, usually a mixture of finely-divided lime and coke, is showered downwardly through a chamber in which it is subjected to the action of a flame and heated gaseous products of combustion and is then collected or massed into a body in the furnace and electrically heated to the requisite temperature. The preheating is preferably effected by withdrawing the waste carbon monoxid from the electric furnace and burning it in the preheating-chamber. Other fuel, such as natural gas or oil, may be employed as a substitute for or adjunct to the carbon monoxid.

The process may be carried out by apparatus of various forms. One which is effective for the purpose is shown in the accompanying drawings, in which—

Figure 1:
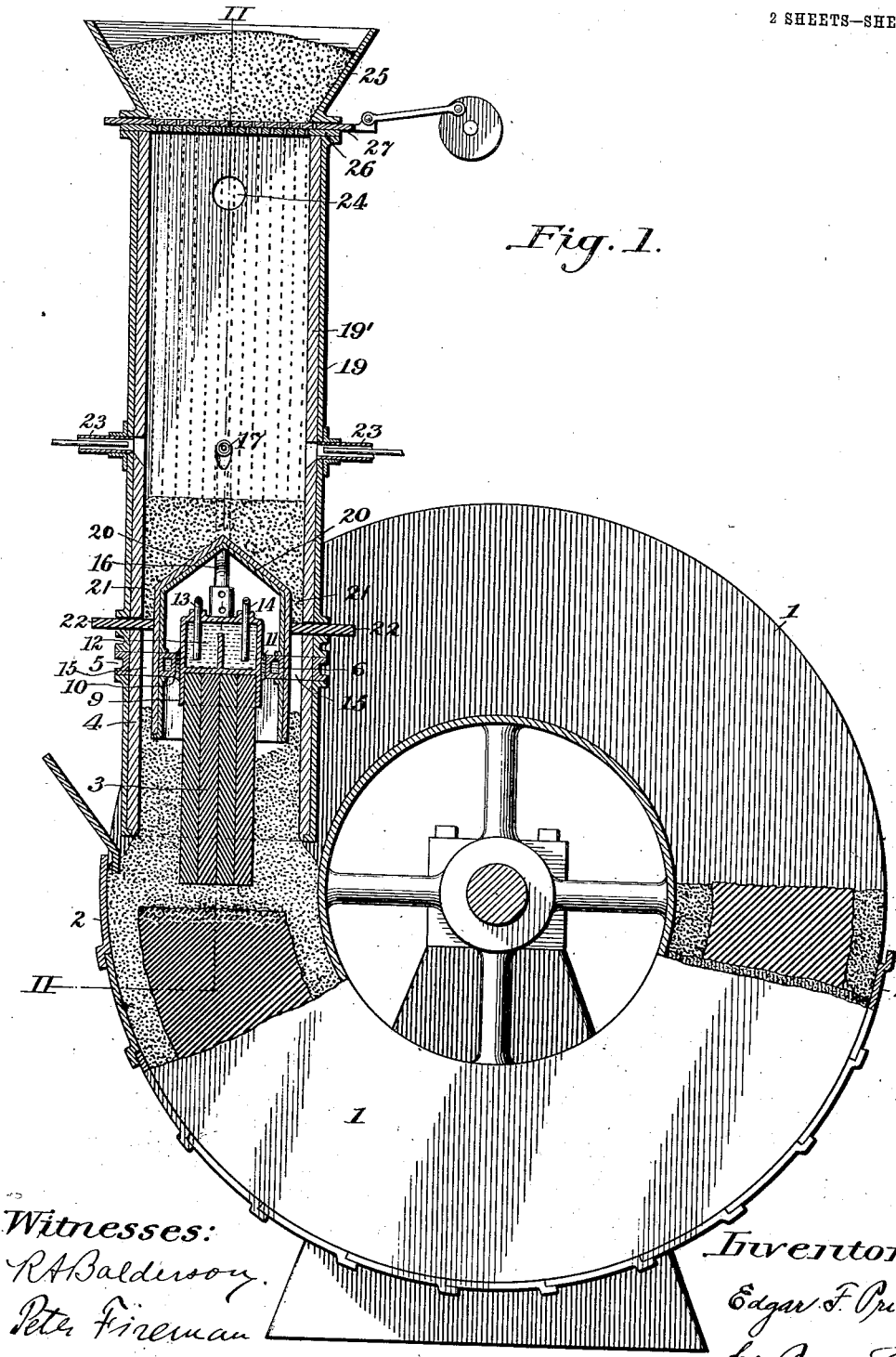
Figure 2:
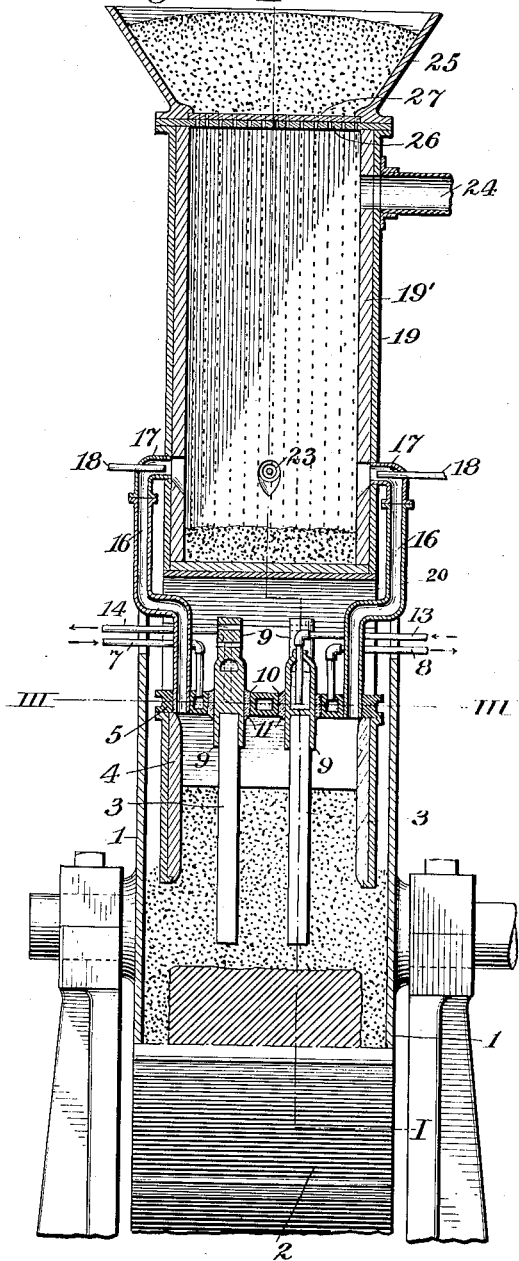
Figure 3:
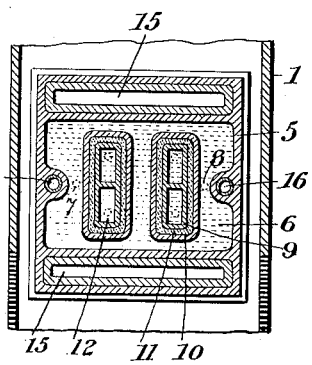

Figure 1 is a vertical longitudinal section on the line I I of Fig. 2. Fig. 2 is a vertical transverse section on the line II II of Fig. 1, and Fig. 3 is a horizontal section on the line III III of Fig. 2.

The furnace chosen for the purpose of illustration is of the well-known Horry type, comprising a wheel 1 with removable cover-plates 2, a pair of electrodes 3, which depend into the charge, and a hood 4 inclosing the electrodes and provided with feed-inlets for the charge and outlets for the waste gases. The upper end of the hood is closed by a horizontal plate 5, within which is a cooling-chamber 6, having pipes 7 8 for the introduction and discharge of water. Each of the electrodes 3 consists of a group of carbon rods, here shown as rectangular and four in number, with their upper ends secured in a socket or sockets in the lower end of a holder 9, which passes loosely through an opening 10 in the plate 5. The space between each of the electrode-holders and the walls of the opening around it is filled by a luting 11 of refractory cement. The upper part of each electrode-holder contains a cooling-chamber 12, having pipes 13 14 for the introduction and discharge of water. Through opposite sides of the plate 5 extend rectangular passages 15 for the introduction of the charge. Pipes 16 for the removal of the carbon monoxid and other gases extend upward through the plate 5 and are connected at their upper ends to burners 17, receiving air-pipes 18, which enter openings in the sides of the preheating-chamber. The preheating-chamber 19 is supported on the plate 5, its walls being in line with those of the hood. This chamber and the hood have a lining 19' of fire-brick, preferably of magnesia or siloxicon. The furnace-walls may also be lined with fire-brick. The lower end of the preheating-chamber has a transverse passage 20, which is protected by a layer 20', of refractory material. The upper ends of the electrode-holders and the pipes for supplying and discharging water are arranged in this passage, which being open at its ends exposes these metallic parts to the cooling action of the atmosphere and gives ready access to them. At each side of the passage 20 are chutes 21 in line with the charging-openings 15 through the cover-plate. Slides 22, of refractory material, are arranged in these conduits to regulate the delivery of the preheated material. Auxiliary burners 23, supplied by gaseous or liquid fuel from some external source, pass through the front and rear walls of the preheating-chamber. The products of combustion escape from the upper end of the chamber through a flue 24 and may be used in a hot-blast oven to heat air for the burners. Upon the upper end of the preheating-chamber is a hopper 25, the lower end of which is closed by a perforated plate 26. Another perforated plate 27 is arranged to reciprocate upon the plate 26, being driven by a crank and pitman.

During the operation of the furnace the mixture of finely-ground lime and coke in the hopper 25 is delivered by the perforated plates in the form of a shower, which falls freely downward through the preheating-chamber against the hot products of combustion rising from the burners and collects in the lower part of the chamber. It is thence delivered into the electric furnace, as required, by withdrawing the slides 22 and massed or collected into a body around the electrodes 3. The preheated material is readily converted into calcium carbid by an electric current passed between the electrodes.

I am aware that United States Patent No. 557,057, granted March 24, 1896, to Edward N. Dickerson, discloses a process of producing calcium carbid which consists in feeding the charge into an electric furnace and utilizing the carbon monoxid to heat the mixture as it is being fed into the furnace. While the present process is generically included within the terms of this patent, it specifically differs therefrom in that the charge is preheated by being showered downwardly through the burning carbon monoxid instead of being packed in a muffle which is heated externally. I am also aware that United States Patent No. 656,599, granted August 21, 1900, to Reuben Doolittle, describes a process of making carbids in which the charge falls downwardly through a vertical shaft between burners and then between a series of electrodes. In this case, however, a large number of electrodes is necessary to heat the charge to the requisite high temperature on account of the short period of time during which it is exposed to the action of each electric arc as it falls through it. In my process the preheated particles of the charge are collected into a body and are then efficiently heated by the action of an electric current passed through the body, usually in the form of an arc between the ends of electrodes extending into the charge.

While the process has been specifically described in connection with the production of calcium carbid, it is obvious that it may be employed for various chemical and metallurgical operations in which finely-divided material must be heated to a high temperature.

The term "relatively large body" occurring in the claims means the body produced by arresting the downward movement of the falling particles of the shower until a considerable amount of the material accumulates in the region of the smelting zone, so that it can be subjected to the electric heating for a relatively considerable period. By collecting such considerable amount of material and surrounding the smelting zone therewith the heat imparted to the showered charge is retained in the material and the body of material surrounding the smelting zone serves to retain the heat developed by the electric current. The term "divided materials" is intended to mean ground, pulverized, comminuted, granular, and similar materials.

I claim—

1. The process of smelting a charge of divided materials, which consists in preheating the charge by showering it through a hot atmosphere, collecting the showered particles into a relatively large body, and electrically heating said body to the required temperature, as set forth.

2. The process of smelting a charge of divided materials, which consists in preheating the charge by showering it through a hot atmosphere, collecting the showered particles into a relatively large body, electrically heating said body to the required temperature, removing the product and supplying fresh materials as required, as set forth.

3. The process of smelting a charge of divided materials, which consists in preheating the charge by showering it through a hot atmosphere, collecting the showered particles into a relatively large body, electrically heating said body to the required temperature, and maintaining the smelting zone or region of highest temperature within said body, as set forth.

4. The process of smelting a charge of divided materials, which consists in preheating the charge by showering it through a hot atmosphere, collecting the showered particles into a relatively large body, electrically heating said body to the required temperature, maintaining the smelting zone or region of highest temperature within said body, removing the product and supplying fresh materials as required, as set forth.

5. The process of smelting a charge of divided materials, which consists in preheating the charge by showering it through a hot atmosphere, collecting the showered particles into a relatively large body, and heating said body to the required temperature by an electric arc or arcs maintained within the body, as set forth.

6. The process of smelting a charge of divided materials, which consists in preheating the charge by showering it through a hot atmosphere, collecting the showered particles into a relatively large body, heating said body to the required temperature by an electric arc or arcs maintained within the body, removing the product and supplying fresh materials as required, as set forth.

7. The process of producing calcium carbid, which consists in showering a charge of divided lime and carbon through a hot atmosphere, collecting the showered particles into a relatively large body, and electrically heating said body to the required temperature, as set forth.

8. The process of producing calcium carbid, which consists in showering a charge of divided lime and carbon through a hot atmosphere, collecting the showered particles into a relatively large body, electrically heating said body to the required temperature, removing the carbid and supplying fresh materials as required, as set forth.

9. The process of producing calcium carbid, which consists in showering a charge of divided lime and carbon through a hot atmosphere, collecting the showered particles into a relatively large body, electrically heating said body to the required temperature, and maintaining the smelting zone or region of highest temperature within said body, as set forth.

10. The process of producing calcium carbid, which consists in showering a charge of divided lime and carbon through a hot atmosphere, collecting the showered particles into a relatively large body, electrically heating said body to the required temperature, maintaining the smelting zone or region of highest temperature within said body, removing the carbid and supplying fresh materials as required, as set forth.

11. The process of producing calcium carbid, which consists in showering a charge of divided lime and carbon through a hot atmosphere, collecting the showered particles into a relatively large body, and heating said body to the required temperature by an electric arc or arcs maintained within the body, as set forth.

12. The process of producing calcium carbid, which consists in showering a charge of divided lime and carbon through a hot atmosphere, collecting the showered particles into a relatively large body, heating said body to the required temperature by an electric arc or arcs maintained within the body, removing the carbid and supplying fresh materials as required, as set forth.

13. The process of smelting a charge of divided materials, which consists in preheating the charge by showering it through a hot atmosphere, collecting the showered particles into a relatively large body, electrically heating said body to the required temperature, and burning the gases produced by the reaction to furnish the preheating atmosphere, as set forth.

14. The process of smelting a charge of divided materials, which consists in preheating the charge by showering it through a hot atmosphere, collecting the showered particles into a relatively large body, electrically heating said body to the required temperature, maintaining the smelting zone or region of highest temperature within said body, and burning the gases produced by the reaction to furnish the preheating atmosphere, as set forth.

15. The process of producing calcium carbid, which consists in showering a charge of divided lime and carbon through a hot atmosphere, collecting the showered particles into a relatively large body, electrically heating said body to the required temperature, and burning the gases produced by the reaction to furnish the preheating atmosphere, as set forth.

16. The process of producing calcium carbid, which consists in showering a charge of divided lime and carbon through a hot atmosphere, collecting the showered particles into a relatively large body, electrically heating said body to the required temperature, maintaining the smelting zone or region of highest temperature within said body, and burning the gases produced by the reaction to furnish the preheating atmosphere, as set forth.

17. The process of smelting a charge of divided materials, which consists in preheating the charge by showering it through a hot atmosphere, collecting the showered particles into a relatively large body, and electrically heating said body to the required temperature by means of electrodes the ends of which are embedded in said body, as set forth.

18. The process of smelting a charge of divided materials, which consists in preheating the charge by showering it through a hot atmosphere, collecting the showered particles into a relatively large body, electrically heating said body to the required temperature by means of electrodes the ends of which are embedded in said body, removing the product and supplying fresh materials as required, as set forth.

19. The process of smelting a charge of divided materials, which consists in preheating the charge by showering it through a hot atmosphere, collecting the showered particles into a relatively large body, and heating said body to the required temperature by an electric arc or arcs by means of electrodes the ends of which are embedded in said body, as set forth.

20. The process of smelting a charge of divided materials, which consists in preheating the charge by showering it through a hot atmosphere, collecting the showered particles into a relatively large body, heating said body to the required temperature by an electric arc or arcs by means of electrodes the ends of which are embedded in said body, removing the product and supplying fresh materials as required, as set forth.

21. The process of producing calcium carbid, which consists in showering a charge of divided lime and carbon through a hot atmosphere, collecting the showered particles into a relatively large body, and electrically heating said body to the required temperature by means of electrodes the ends of which are embedded in said body.

22. The process of producing calcium carbid, which consists in showering a charge of divided lime and carbon through a hot atmosphere, collecting the showered particles into a relatively large body, electrically heating said body to the required temperature by means of electrodes the ends of which are embedded in said body, removing the carbid and supplying fresh materials as required, as set forth.

23. The process of producing calcium carbid, which consists in showering a charge of divided lime and carbon through a hot atmosphere, collecting the showered particles into a relatively large body, and heating said body to the required temperature by an electric arc or arcs by means of electrodes the ends of which are embedded in said body, as set forth.

24. The process of producing calcium carbid, which consists in showering a charge of divided lime and carbon through a hot atmosphere, collecting the showered particles into a relatively large body, heating said body to the required temperature by an electric arc or arcs by means of electrodes the ends of which are embedded in said body, removing the carbid and supplying fresh materials as required, as set forth.

25. The process of producing calcium carbid, which consists in showering a charge of divided lime and carbon through a hot atmosphere, collecting the showered particles into a relatively large body, electrically heating said body to the required temperature, rotating and thereby removing the carbid from the heating zone, and supplying fresh materials as required, as set forth.

26. The process of producing calcium carbid, which consists in showering a charge of divided lime and carbon through a hot atmosphere, collecting the showered particles into a relatively large body, heating said body to the required temperature by an electric arc or arcs by means of electrodes the ends of which are embedded in said body, rotating and thereby removing the carbid from the heating zone, and supplying fresh materials as required, as set forth.

In testimony whereof I affix my signature in presence of two witnesses.

EDGAR F. PRICE.

Witnesses:
CHARLES E. BILLINGS,
EDW. J. SCHNEIDER.